(12) United States Patent
Okada et al.

(10) Patent No.: US 11,747,551 B2
(45) Date of Patent: Sep. 5, 2023

(54) PLASTIC OPTICAL FIBER

(71) Applicant: NITTO DENKO CORPORATION, Osaka (JP)

(72) Inventors: Yasuaki Okada, Osaka (JP); Takeshi Saito, Osaka (JP); Kenjiro Saomoto, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 17/764,419

(22) PCT Filed: Sep. 30, 2020

(86) PCT No.: PCT/JP2020/037214
§ 371 (c)(1),
(2) Date: Mar. 28, 2022

(87) PCT Pub. No.: WO2021/066031
PCT Pub. Date: Apr. 8, 2021

(65) Prior Publication Data
US 2022/0373755 A1 Nov. 24, 2022

(30) Foreign Application Priority Data
Sep. 30, 2019 (JP) .................. 2019-179497

(51) Int. Cl.
*G02B 6/02* (2006.01)
*G02B 6/44* (2006.01)

(52) U.S. Cl.
CPC ....... *G02B 6/02033* (2013.01); *G02B 6/4482* (2013.01); *G02B 6/02395* (2013.01)

(58) Field of Classification Search
CPC ............ G02B 6/02033; G02B 6/02395; G02B 6/4482
See application file for complete search history.

(56) References Cited

U.S. PATENT DOCUMENTS 7,289,706 B2 * 10/2007 Chien .................. G02B 6/4482
  385/128
8,023,789 B2 * 9/2011 Aoyagi .................. G02B 1/045
  385/100

(Continued)

FOREIGN PATENT DOCUMENTS

JP   H05-222136 A   8/1993
JP   2002-503282 A   1/2002

(Continued)

OTHER PUBLICATIONS

International Search Report Issued in PCT/JP2020/037214 dated Nov. 10, 2020.

(Continued)

*Primary Examiner* — Ryan A Lepisto
(74) *Attorney, Agent, or Firm* — Edwards Neils LLC; Jean C. Edwards, Esq.

(57) ABSTRACT

A plastic optical fiber includes a plastic optical fiber body and a coloring member covering a peripheral surface of the plastic optical fiber body. The coloring member is made from a cured product of a curable composition containing an active-energy-ray-curable multifunctional acrylate and a coloring agent. The reaction percentage yield of the vinyl group of the active-energy-ray-curable multifunctional acrylate in the coloring member is 85% or more.

1 Claim, 1 Drawing Sheet

(56) References Cited

U.S. PATENT DOCUMENTS

| | | | |
|---|---|---|---|
| 9,128,245 B2 * | 9/2015 | Fabian | ............... C03C 25/1065 |
| 2004/0218851 A1 | 11/2004 | Izumitani et al. | |
| 2017/0146732 A1 * | 5/2017 | Botelho | ............ G02B 6/02395 |
| 2019/0033516 A1 | 1/2019 | Westbrook | |

FOREIGN PATENT DOCUMENTS

| | | | |
|---|---|---|---|
| JP | 2003-227976 A | 8/2003 |
| JP | 2007-017551 A | 1/2007 |
| JP | 2012-508395 A | 4/2012 |
| JP | 5588451 B2 | 9/2014 |
| JP | 2018-163350 A | 10/2018 |
| JP | 2019-032521 A | 2/2019 |
| WO | 98/56846 A1 | 12/1998 |
| WO | 2010/053356 A2 | 5/2010 |
| WO | 2013/059601 A1 | 4/2013 |
| WO | 2017/212465 A1 | 12/2017 |

OTHER PUBLICATIONS

Written Opinion Issued in PCT/JP2020/037214 dated Nov. 10, 2020.

International Preliminary Report on Patentability issued by WIPO dated Apr. 5, 2022, in connection with International Patent Application No. PCTIJP2020/037214.

* cited by examiner

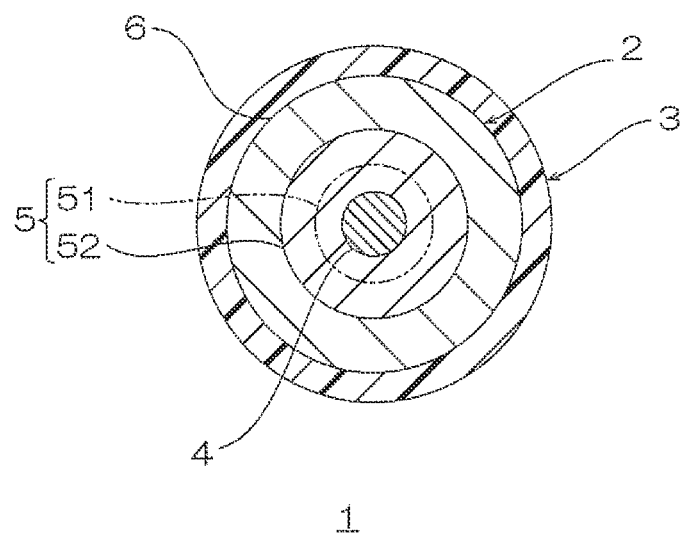

PLASTIC OPTICAL FIBER

CROSS-REFERENCE TO RELATED APPLICATIONS

The present application is a 35 U.S.C. 371 National Stage Entry of: PCT/JP2020/037214, filed on Sep. 30, 2020, which claims priority from Japanese Patent Application No. 2019-179497, filed on Sep. 30, 2019, the contents of all of which are herein incorporated by reference in their entirety.

The present invention relates to a plastic optical fiber.

BACKGROUND ART

A conventional optical fiber including a glass fiber and an ink layer covering the peripheral surface of the glass fiber has been known (for example, see Patent document 1 below).

The optical fiber described in Patent document 1 can be distinguished by the color or pattern of the ink layer.

CITATION LIST

Patent Document

Patent Document 1: Japanese Translation of PCT International Application Publication No. 2012-508395

SUMMARY OF THE INVENTION

Problem to be Solved by the Invention

Meanwhile, the ink layer is required to have excellent adhesion to the glass fiber.

Optical fibers using plastic fiber in place of glass fiber have been considered in these years. The glass fiber is not cracked even when the optical fiber using the glass fiber is exposed to a solvent, and the solvent erodes the ink layer and contacts the glass fiber, and the glass fiber is bent. On the other hand, because plastic has low solvent resistance compared with glass, the fiber using plastic fiber has a disadvantage. The fiber is cracked when a solvent erodes the ink layer and contacts the plastic fiber, and the plastic fiber is bent.

The present invention provides a plastic optical fiber that includes a coloring member with excellent adhesion to the plastic optical fiber body, has excellent solvent resistance, and can suppress damage.

Means for Solving the Problem

The present invention [1] includes a plastic optical fiber including: a plastic optical fiber body; and a coloring member covering a peripheral surface of the plastic optical fiber body, wherein the coloring member is made from a cured product of a curable composition containing an active-energy-ray-curable multifunctional acrylate and a coloring agent, and a reaction percentage yield of a vinyl group of the active-energy-ray-curable multifunctional acrylate in the coloring member is 85% or more.

The present invention [2] includes the plastic optical fiber described in [1], wherein the plastic optical fiber body includes a contact layer being in contact with an internal surface of the coloring member, and a material of the contact layer is a polycarbonate resin and/or a cyclopolyolefin resin.

Effects of the Invention

In the plastic optical fiber of the present invention, the reaction percentage yield of the vinyl group in the active-energy-ray-curable multifunctional acrylate is 85% or more, namely, high. Thus, the coloring member has excellent adhesion to the plastic optical fiber body.

The reaction percentage yield of the vinyl group in the coloring member is also 85% or more, namely, high. Thus, even when the plastic optical fiber is exposed to a solvent, the erosion of the coloring member by the solvent can be suppressed. This can suppress damage to the plastic optical fiber body due to the erosion of the ink layer by the solvent.

BRIEF DESCRIPTION OF THE DRAWINGS

The FIGURE is a cross-sectional view of one embodiment of the plastic optical fiber of the present invention.

DESCRIPTION OF THE EMBODIMENTS

One Embodiment of Plastic Optical Fiber of the Present Invention

One embodiment of the plastic optical fiber of the present invention is described with reference to the FIGURE.

A plastic optical fiber 1 is a fiber extending in a longitudinal direction (corresponding to a direction in the depth of the paper sheet of the drawing of the FIGURE). The plastic optical fiber 1 has an approximately circular shape in a cross section along a direction orthogonal to the longitudinal direction. The plastic optical fiber 1 includes a plastic optical fiber body 2 and a coloring member 3.

The plastic optical fiber body 2 is an optical transmission line that transmits light along the longitudinal direction. The plastic optical fiber body 2 has an approximately circular shape in a cross section orthogonal to an optical transmission direction in which light is transmitted.

The plastic optical fiber body 2 includes, for example, a core portion 4, a cladding portion 5, and an over-cladding portion 6 as an exemplary contact layer sequentially from the center toward the outside in the cross-sectional view.

The core portion 4 has an approximately circular shape in the cross-sectional view. The core portion 4 includes a center of the plastic optical fiber body 2 in the cross-sectional view.

The cladding portion 5 is disposed on an outer peripheral surface of the core portion 4. The cladding portion 5 is held between the core portion 4 and the over-cladding portion 6. The cladding portion 5 has an approximately ringed shape in the cross-sectional view. The cladding portion 5 has a refractive index lower than that of the core portion 4.

The over-cladding portion 6 is disposed on an outer peripheral surface of the cladding portion 5. The over-cladding portion 6 forms an outer peripheral surface of the plastic optical fiber body 2. The over-cladding portion 6 has an approximately ringed shape in the cross-sectional view.

The plastic optical fiber body 2 can have a double-cladding structure, depending on the use and purpose of the plastic optical fiber 1. In such a case, as the phantom lines of the FIGURE show, the cladding portion 5 includes a first cladding portion 51 and a second cladding portion 52 disposed on an outer peripheral surface of the first cladding portion 51. In other words, the cladding portion 5 has a two-layered structure made from the first cladding portion 51 and the second cladding portion 52. The first cladding portion 51 has a refractive index lower than that of the core portion 4. The second cladding portion 52 has a refractive index lower than that of the first cladding portion 51. The over-cladding portion 6 has a refractive index lower than that of the second cladding portion 52.

The material making up the plastic optical fiber body 2 is plastic. The plastic is not especially limited, and examples thereof include thermoplastic resins, for example, acrylic resins (including fluorinated acrylic resin), polycarbonate resins (including modified polycarbonate resin such as polyester-modified polycarbonate resin), and olefin resins such as polyethylene resin, polypropylene resin, and cycloolefin resin. These can be used singly or in combination. The material of the plastic optical fiber body 2 is appropriately selected depending on the refractive indexes that the core portion 4, the cladding portion 5, and the over-cladding portion 6 require.

For the over-cladding portion 6, preferably, polycarbonate resin or olefin resin is used. Particularly preferably, modified polycarbonate resin or cycloolefin resin is used to achieve high reliability.

The plastic optical fiber body 2 is transparent. The plastic optical fiber body 2 has an entire light transmittance of, for example, 85% or more, preferably 90% or more, more preferably 90% or more, and, for example, 100% or less.

The plastic optical fiber body 2 has a diameter of, for example, 10 µm or more and 10 mm or less.

The coloring member 3 is disposed on the outer peripheral surface of the plastic optical fiber body 2. Specifically, the coloring member 3 is in contact with an outer peripheral surface of the over-cladding portion 6. The coloring member 3 forms an outer peripheral surface of the plastic optical fiber 1.

The coloring member 3 is colored. The coloring member 3 has an entire light transmittance of, for example, less than 85%, preferably 80% or less, and, for example, 10% or more. Thus, the plastic optical fiber 1 including the coloring member 3 has distinguishability.

The coloring member 3 is made from a cured product of a curable composition. The curable composition is a material making up the coloring member 3, and contains an active-energy-ray-curable multifunctional acrylate and a colorant.

Without any particular limitation, the coloring member 3 has a thickness of, for example, 0.01 µm or more, preferably 0.1 µm or more, and, for example, 1000 µm or less, preferably 100 µm or less. A ratio of the thickness of the coloring member 3 to the diameter of the plastic optical fiber body 2 is, for example, 0.0001 or more, preferably 0.001 or more, and, for example, 1 or less, preferably 0.5 or less.

Next, a method for producing the plastic optical fiber 1 is described.

The plastic optical fiber body 2 is prepared first in the method. The plastic optical fiber body 2 is produced by, for example, a melt extrusion process. In the melt extrusion process, the core portion 4, the cladding portion 5, and the over-cladding portion 6 are simultaneously formed.

Subsequently, the curable composition is prepared and disposed on the outer peripheral surface of the plastic optical fiber body 2. Thereafter, the curable composition is cured.

The curable composition contains an active-energy-ray-curable resin and a colorant.

Specifically, the curable composition contains, for example, an active-energy-ray-curable multifunctional acrylate, an active-energy-ray initiator, and a colorant.

The active-energy-ray-curable multifunctional acrylate has a vinyl group. Specifically, the active-energy-ray-curable multifunctional acrylate has a vinyl group and an aromatic ring group.

Examples of the aromatic ring group include phenyl and naphthyl. Preferably, phenyl is used.

The active-energy-ray-curable multifunctional acrylates can be used singly or in combination.

When an active-energy-ray-curable multifunctional acrylate is singly used, the active-energy-ray-curable multifunctional acrylate has a vinyl group and an aromatic ring group. On the other hand, when active-energy-ray-curable multifunctional acrylates are used in combination, all of the active-energy-ray-curable multifunctional acrylates have a vinyl group, or one of the energy-ray-curable multifunctional acrylates has a vinyl group and an aromatic ring group and the other energy-ray-curable multifunctional acrylates have a vinyl group and no aromatic ring group.

The coloring agent is appropriately selected depending on the use and purpose of the plastic optical fiber 1. Examples of the coloring agent include pigments and dyes. Preferably, a pigment is used. The pigment is not especially limited and examples thereof include white pigments, black pigments, yellow pigments, green pigments, red pigments, and blue pigments.

The mixing ratio of each material is appropriately set depending on the use and purpose of the plastic optical fiber 1. A ratio of the active-energy-ray-curable multifunctional acrylate in the curable composition is, for example, 50% by mass or more, preferably 75% by mass or more, and, for example, 99% by mass or less. Relative to 100 parts by mass of the active-energy-ray-curable multifunctional acrylate, the coloring agent content is, for example, 1 part by mass or more, and, for example, 25 parts by mass or less.

The prepared curable composition is allowed to contain oxygen. The oxygen is derived from the air in which the curable composition is prepared.

A commercially available product can be used as the curable composition. For example, the Optical Fiber Coloring Ink series (manufactured by PhiChem) is used.

Next, the curable composition is applied on the outer peripheral surface of the plastic optical fiber body 2. Thereafter, the curable composition is irradiated with an active energy ray.

For the application of the curable composition, a known application device is used.

Examples of the active energy ray include ultraviolet rays (including UVA (long-wavelength ultraviolet rays) and UVB (short-wavelength ultraviolet rays)), $\alpha$ rays, $\beta$ rays, $\gamma$ rays, and X rays. Preferably, ultraviolet rays are used.

For the active energy ray irradiation, a light source and an irradiation chamber facing the light source are used.

The irradiation chamber has a structure through which the plastic optical fiber body 2 coated with the curable composition can pass. The irradiation chamber has, for example, an approximately tubular shape made of a light transmissive material (such as quartz). Inert gas can flow into the irradiation chamber in radical polymerization. Examples of the gas include nitrogen gas, carbon dioxide gas, and helium gas. Preferably, nitrogen gas is used. The gas flow rate is appropriately set depending on the volume of the irradiation chamber and/or the speed at which the plastic optical fiber body 2 coated with the curable composition passes. Specifically, the gas flow rate is, for example, 3 L/min or more, preferably 5 L/min or more, more preferably 8 L/min or more, and, for example, 100 L/min or less.

In the method, the plastic optical fiber body 2 having the outer peripheral surface coated with the curable composition passes through the irradiation chamber of the irradiation device.

When oxygen is dissolved in the curable composition, the radical polymerization of the vinyl group in the active-energy-ray-curable multifunctional acrylate is inhibited. However, when an inert gas is injected into the irradiation chamber, the gas is dissolved in the curable composition and the oxygen dissolved in the curable composition is expelled from the curable composition. In this manner, the oxygen concentration in the curable composition decreases. Thus, the above-described inhibition of the radical polymerization is suppressed and the reaction percentage yield of the vinyl group increases.

In this manner, the curable composition is cured, thereby producing a cured product of the curable composition. In this manner, the coloring member 3 made from the cured product is formed on the outer peripheral surface of the plastic optical fiber body 2.

The reaction percentage yield of the vinyl group of the active-energy-ray-curable multifunctional acrylate in the coloring member 3 is 85% or more. The reaction percentage yield of the vinyl group is, preferably, 88% or more, more preferably 90% or more, even more preferably 92% or more, and, for example, 100% or less.

When the reaction percentage yield of the vinyl group is less than 85%, the adhesion of the coloring member 3 to the plastic optical fiber body 2 is reduced. When the reaction percentage yield of the vinyl group is less than 85%, the solvent resistance of the coloring member 3 is reduced. This causes a crack in the plastic optical fiber body 2 when the plastic optical fiber 1 is exposed to the solvent, the solvent erodes the coloring member 3 and contacts the plastic optical fiber body 2, and the plastic optical fiber 1 is bent.

The reaction percentage yield of the vinyl group in the active-energy-ray-curable multifunctional acrylate is obtained by FT-IR based on ATR (attenuated total reflection) spectroscopy. In FT-IR, the ratio of the absorbance peak (peak height) derived from the vinyl group to the absorbance peak (peak height) derived from the aromatic ring group (specifically, phenyl group) is obtained as the "vinyl content". Subsequently, the reaction percentage yield represented by the following formula is obtained.

Reaction Percentage Yield (%)=[(Vinyl Content in Curable Composition before Curing)−(Vinyl Content in Curable Composition after Curing)]/(Vinyl Content in Curable Composition before Curing)×100

In IR spectra, the peak derived from the vinyl group is located at a wavelength of 810 cm$^{-1}$. The peak derived from the phenyl group is located at a wavelength of 1510 cm$^-$.

Operations and Effects of One Embodiment

In the plastic optical fiber 1, the reaction percentage yield of the vinyl group in the active-energy-ray-curable multifunctional acrylate is 85% or more, namely, high. Thus, the coloring member 3 has excellent adhesion to the plastic optical fiber body 2.

The reaction percentage yield of the vinyl group in the coloring member 3 is 85% or more, namely, high. Thus, when the plastic optical fiber 1 is exposed to a solvent (specifically, an organic solvent), the erosion of the coloring member 3 by the solvent is suppressed. This can suppress the damage to the plastic optical fiber body 2 due to the erosion of the coloring member 3 by the solvent. Specifically, the occurrence of a crack in the plastic optical fiber body 2 can be suppressed.

(Variations)

In each of the following variations, the same members and steps as in the above-described embodiment will be given the same numerical references and the detailed description will be omitted. Further, the variations can have the same operations and effects as those of the embodiment unless especially described otherwise. Furthermore, the embodiment and the variations can appropriately be combined.

In one embodiment, inert gas is injected into the irradiation chamber at the active energy ray irradiation. The gas injection is not limited to the above. The above-described gas can be injected into the curable composition before the application in place of or in addition to the injection into the above-described irradiation chamber. The method of reducing the oxygen concentration in the curable composition is not limited to the above-described ones.

In one embodiment, the vinyl content is obtained from the ratio of the absorbance of the vinyl group to the absorbance of the aromatic ring group (phenyl group). However, for example, instead of using the absorbance peak of the aromatic ring group, the vinyl content can be obtained from the ratio of the absorbance of the vinyl group in the curable composition before the curing to the absorbance of the vinyl group in the curable composition after the curing.

In the above-described embodiment, the vinyl content is obtained based on the absorbance peak of the aromatic ring group, which does not quantitatively change before and after the reaction. Alternatively, the vinyl content can be obtained based on a group other than the aromatic ring group as the group that does not quantitatively change before and after the reaction.

The plastic optical fiber 1 has an approximately circular shape. The shape is not especially limited. The shape may be an approximately rectangular shape in the cross-sectional view although not illustrated.

The FIGURE shows the plastic optical fiber body 2 including the core portion 4, the cladding portion 5, and the over-cladding portion 6. For example, although not illustrated, the plastic optical fiber body 2 does not include an over-cladding portion 6 and includes only a core portion 4 and a cladding portion 5 as an exemplary contact layer. In such a case, the coloring member 3 is in contact with the outer peripheral surface of the cladding portion 5.

EXAMPLE

The present invention is described in more detail below with reference to Examples and Comparative Examples. The present invention is not limited to Examples and Comparative Examples in any way. The specific numeral values used in the description below, such as mixing ratios (contents), physical property values, and parameters can be replaced with the corresponding mixing ratios (contents), physical property values, and parameters in the above-described "DESCRIPTION OF THE EMBODIMENTS", including the upper limit values (numeral values defined with "or less", and "less than") or the lower limit values (numeral values defined with "or more", and "more than").

Example 1

A plastic optical fiber body 2 with an external diameter of 470 μm, which includes a core portion 4 made of polymethylmethacrylate (PMMA) (manufactured by Mitsubishi Chemical Corporation), a cladding portion 5 made of fluorinated PMMA (manufactured by Daikin Industries, Ltd. FM450), and an over-cladding portion 6 made of XYLEX X7300CL (trade name, manufactured by SABIC Innovative Plastic, polyester-modified polycarbonate resin), was produced by a melt extrusion process.

Optical Fiber Coloring Ink blue (containing an active-energy-ray-curable multifunctional acrylate and a blue pigment, and manufactured by PhiChem) was prepared as a curable composition.

Thereafter, an application device and an irradiation device were sequentially disposed on a downstream side in a conveyance direction. The application device included an application outlet with an interior diameter of 510 μm. The irradiation device included a microwave-excited D bulb as a light source and a quartz tube as an irradiation chamber.

The curable composition was charged into the application device (die diameter: 510 μm). Nitrogen gas was injected at a flow rate of 5 L/min into the irradiation device.

Subsequently, the above-described plastic optical fiber body passed through the application device, thereby applying the curable composition on the peripheral surface of the plastic optical fiber body. Subsequently, using the irradiation device (manufactured by Fusion UV systems, INC. D bulb), the curable composition was irradiated with an ultraviolet ray with an energy of 331 mJ/cm$^2$ and cured, thereby forming a coloring member.

Example 2 Through Comparative Example 3

Plastic optical fibers 1 were produced in the same manner as Example 1 except that the method of producing the plastic optical fiber 1 was changed according to Table 1.
Evaluation
The following items of the plastic optical fiber 1 of each of Examples and Comparative Examples were evaluated.
(Adhesion)
A double-sided pressure-sensitive adhesive tape (manufactured by Nitto Denko Corporation, No. 500) was adhered to a surface of a rectangular plate.

Next, five plastic optical fibers 1 with a longitudinal length of 5 cm were disposed in parallel to each other on the front adhesive side of the double-sided pressure-sensitive adhesive tape. Subsequently, the five plastic optical fibers 1 were pressed onto the double-sided pressure-sensitive adhesive tape with the finger.

Thereafter, a plurality of slits was made on the plastic optical fibers along a direction in which the plastic optical fibers 1 were disposed in parallel using a cutter knife. The slits were made at 0.5-mm intervals in the longitudinal direction. In this manner, each plastic optical fiber 1 was divided into 10 units (squares).

Thereafter, a single-sided pressure-sensitive adhesive tape (manufactured by Nitto Denko Corporation, No. 5000NS) was adhered to the plastic optical fibers and pressed using a 1-kg roller. Thereafter, the single-sided pressure-sensitive adhesive tape was peeled from the plastic optical fiber 1 at a peeling rate of 1000 mm/min or more. The adhering and peeling was repeated twice.

Thereafter, the number of the units (squares) from which the coloring member 3 was peeled off was counted.

The percentage of the number of the units (squares) from which the coloring member 3 was peeled off was obtained as a peeling rate (%).
Excellent: The peeling rate was 0%.
Good: The peeling rate was 1% or more and 40% or less.
Bad: The peeling rate was 41% or more.
(Reaction Percentage Yield of Vinyl Group)
The spectra were obtained by FT-IR measurement of the coloring member 3 (a cured product after the curing) of the plastic optical fiber 1 in an ATR method. The conditions for the FT-IR are described as follows.
FT-IR: manufactured by Thermo fisher scientific nicolet 4700
Cumulated number: 32
Detector: DTGS
From the obtained spectra, the absorbance (peak height) derived from the phenyl group at 1510 cm$^-$ and the absorbance (peak height) derived from the vinyl group at 810 cm$^{-1}$ were obtained. The ratio of the absorbance (peak height) derived from the vinyl group at 810 cm$^{-1}$ to the absorbance (peak height) derived from the phenyl group at 1510 cm$^{-1}$ was obtained as the vinyl content.

At the same time, the above-described ratio of the absorbance of the curable composition before the curing was obtained as the vinyl content in the same manner as the manner in which the ratio in the coloring member 3 was obtained.

Thereafter, in accordance with the following formula, the reaction percentage yield of the vinyl group was obtained.

Reaction Percentage Yield of Vinyl Group (%)=[(Vinyl Content in Curable Composition before Curing)−(Vinyl Content in Curable Composition after Curing)]/(Vinyl Content in Curable Composition before Curing)×100

(Solvent Resistance) A plastic optical fiber 1 with a longitudinal length of 1 m was curved into a circular arc shape with a radius of curvature of 10 mm or more, and put in a 250 mm×350 mm tray. Subsequently, diisononyl phthalate (a solvent) was poured in the tray so that a longitudinal-direction intermediate part of the plastic optical fiber 1 was completely covered with the solvent.

Thereafter, the tray was left at room temperature for a day. Thereafter, the plastic optical fiber 1 was removed from the tray.

The removed plastic optical fiber 1 was observed with an optical microscope (manufactured by KEYENCE CORPORATION, "VHX-950F", lens: VH-Z100R), and the solvent resistance was evaluated in accordance with the following criteria.
Good: The occurrence of a crack in the plastic optical fiber body 2 was not confirmed.
Bad: The occurrence of a crack in the plastic optical fiber body 2 was confirmed.

TABLE 1

| Example • Comparative Example | UV irradiation | Nitrogen flow rate (L/min) | Reaction percentage yield of vinyl group | Solvent resistance | Adhesion |
|---|---|---|---|---|---|
| Example 1 | Performed | 5 | 87 | Good | Good |
| Example 2 | Performed | 10 | 91 | Good | Good |
| Example 3 | Performed | 20 | 92 | Good | Excellent |
| Comparative Example 1 | Not performed | 0 | 0 | Bad | Bad |
| Comparative Example 2 | Performed | 0 | 75 | Bad | Bad |
| Comparative Example 3 | Performed | 1 | 80 | Bad | Bad |

While the illustrative embodiments of the present invention are provided in the above description, such is for illustrative purpose only and it is not to be construed as limiting in any manner. Modification and variation of the present invention that will be obvious to those skilled in the art is to be covered by the following claims.

INDUSTRIAL APPLICABILITY

The plastic optical fiber is used for various types of optical transmission.

DESCRIPTION OF REFERENCE NUMERALS

1 plastic optical fiber
2 plastic optical fiber body
3 coloring member
6 over-cladding portion (exemplary contact layer)

The invention claimed is:
1. A plastic optical fiber comprising:
a plastic optical fiber body; and
a coloring member covering a peripheral surface of the plastic optical fiber body,
wherein the coloring member is made from a cured product of a curable composition containing an active-energy-ray-curable multifunctional acrylate and a coloring agent,
wherein a reaction percentage yield of a vinyl group of the active-energy-ray-curable multifunctional acrylate in the coloring member is 85% or more,
wherein the plastic optical fiber body includes a contact layer being in contact with an internal surface of the coloring member, and
wherein a material of the contact layer is a polycarbonate resin and/or a cyclopolyolefin resin.

* * * * *